United States Patent [19]

Kynast et al.

[11] Patent Number: 5,772,917
[45] Date of Patent: Jun. 30, 1998

[54] LUMINESCENT ZEOLITE

[75] Inventors: Ulrich H. Kynast, Roetgen; Volker U. Weiler, Aachen, both of Germany

[73] Assignee: U.S. Philips Corporation, New York, N.Y.

[21] Appl. No.: 795,121

[22] Filed: Feb. 7, 1997

[30]    Foreign Application Priority Data

Feb. 8, 1996   [EP]   European Pat. Off. .............. 96200282

[51] Int. Cl.$^6$ ................................................... C09K 11/06
[52] U.S. Cl. ........................... 252/301.4 R; 252/304.4 R; 423/713; 423/DIG. 21; 313/483; 313/486; 313/463; 313/467; 313/503
[58] Field of Search ............................... 502/79; 423/713, 423/DIG. 21; 252/301.4 R, 301.4 F; 313/483, 486, 463, 503, 467

[56]    References Cited

U.S. PATENT DOCUMENTS 5,464,467   11/1995   Fitch et al. ................................. 502/79
5,574,332   11/1996   Kynast et al. ........................... 313/483

*Primary Examiner*—Melissa Bonner

[57]    ABSTRACT

The invention relates to a luminescent zeolite of the Faujasite type containing $Ce^{3+}$ ions. Such a zeolite can for instance be used in the luminescent screen of a low pressure mercury discharge lamp for use in photochemical processes. According to the invention the zeolite further contains cations $S^{n+}$, wherein $n \geq 2$ and the sum of the amount of $Ce^{3+}$ ions and the amount of cations $S^{n+}$ per unit cell of the zeolite is at least 16. The zeolite exhibits a high quantum efficiency for converting UV radiation of 254 nm into radiation having an emission maximum between 315 and 400 nm, even in case the $Ce^{3+}$ ion content is relatively low.

11 Claims, No Drawings

LUMINESCENT ZEOLITE

BACKGROUND OF THE INVENTION

The invention relates to a luminescent zeolite of the Faujasite type containing $Ce^{3+}$ ions wherein the Si/Al atomic ratio of the zeolite is in the range 1.0–4.0 and to a method for preparing such a zeolite.

The invention also relates to a luminescent screen and to a low pressure mercury discharge lamp provided with such a screen.

A luminescent zeolite as mentioned in the opening paragraph is known from international patent application WO 95/16759. The known zeolite has excellent properties for use in a luminescent screen. In general a luminescent screen is used to convert excitation energy into radiation within a certain range of wavelengths. The excitation energy can for instance consist of an electron beam, X-rays or UV-radiation of relatively short wavelengths. Among many other applications luminescent screens find application in lamps, particularly in low pressure mercury discharge lamps or fluorescent lamps. The excitation energy then mainly comprises UV-radiation of approximately 254 nm generated by mercury present in the plasma of the fluorescent lamp. The composition of a luminescent screen is generally chosen in dependence of the desired spectral composition of the light radiated by the fluorescent lamp. In many applications it is desirable that the fluorescent lamp radiates only light in the visible part of the spectrum. However, in some applications for instance in lamps for influencing photochemical processes, such as polymerization, lacquer hardening, drying, curing, medical irradiation purposes or suntanning, it is desirable that at least part of the light radiated by the lamp is UV-radiation, more in particular so called UV-A-radiation having wavelengths between 315 and 400 nm. In case the known zeolite is excited by UV-radiation with a wavelength of 254 nm, it emits UV-radiation having an emission maximum between 315 nm and 400 nm. Depending on the amount of $Ce^{3+}$ ions the quantum efficiency can be very high. The known zeolite is therefore very suitable to be used in the luminescent screen of a low pressure mercury discharge lamp that is used for these photochemical processes. A disadvantage of the known zeolite, however, in case it has been heated to several hundred degrees centigrade (for instance in a process for coating a lamp vessel with a luminescent layer comprising the known zeolite), is that the quantum efficiency is only high in case the zeolite contains a relatively large amount of $Ce^{3+}$ ions. In fact the quantum efficiency is only relatively high in case the amount of $Ce^{3+}$ ions per unit cell is higher than 16. This means that in the known zeolite a very large part of the $Ce^{3+}$ ions does hardly contribute to the luminescent properties of the zeolite so that the $Ce^{3+}$ ions incorporated in the zeolite are inefficiently used.

SUMMARY OF THE INVENTION

The invention aims to provide a luminescent zeolite that has a relatively high quantum efficiency even in case the zeolite has been heated to several hundred degrees centigrade and its $Ce^{3+}$ ion content is relatively low.

A luminescent zeolite as mentioned in the opening paragraph is therefore according to the invention characterized in that the zeolite further contains cations $S^{n+}$ wherein $n \geq 2$, and in that the sum of the amount of $Ce^{3+}$ ions and the amount of cations $S^{n+}$ per unit cell of the zeolite is at least 16. It was found that the zeolite according to the invention has a relatively high quantum efficiency, also for $Ce^{3+}$ ion contents far lower than 16 $Ce^{3+}$ ions per unit cell.

It was also found that good results were obtained in case the amount of cations $S^{n+}$ per unit cell of the zeolite is at least 1. Similarly good results were obtained in case the amount of $Ce^{3+}$ ions per unit cell is at least 1.

Good results were obtained in case the cations $S^{n+}$ comprise $La^{3+}$ ions.

It is possible to prepare a zeolite according to the invention by introducing the cations $S^{n+}$ and the $Ce^{3+}$ ions into the zeolite at the same time. It has also been found, however, that a comparatively high quantum efficiency was obtained in case the zeolite according to the invention was prepared by a method comprising the following successive steps introducing cations $S^{n+}$ into a zeolite of the Faujasite type wherein the Si/Al ratio is in the range of 1.0–4.0 by means of ion exchange, heating the zeolite, introducing $Ce^{3+}$ ions into the zeolite by means of ion exchange, and heating the zeolite.

It is also possible for part of the cations $S^{n+}$ to be rare earth ions emitting in the visible region of the spectrum, such as $Tb^{3+}$ or $Eu^{3+}$. When such a zeolite is excited by 254 nm radiation, at least part of the excited $Ce^{3+}$ ions transfers its excitation energy to the rare earth metal ions emitting visible radiation when activated. Thus such a zeolite emits visible radiation when activated as well as UV-A radiation in case the energy transfer is not complete.

DETAILED DESCRIPTION OF THE INVENTION

The following is a typical example of the preparation of a luminescent zeolite according to the invention.

2 gram of a zeolite of the Faujasite type and approximately of formula $Na_{86.9}(Al_{86.9}Si_{105.1}O_{384}) \cdot 264\ H_2O$ was suspended in 18.24 ml $H_2O$. The pH is adjusted to ca. 5 with 0.1 n HCl. To this suspension 1.76 ml of aqueous $LaCl_3$ (1M) was added. The resulting mixture is refluxed for 24 hours. The solid is filtered off, washed with $H_2O$ (3×20 ml), and dried at 120° C. in vacuo. The resulting powder is calcined under oxygen at 600° C. for 2 hours (heating-up rate 1° C./min.) After cooling the powder is suspended in 18.24 ml $H_2O$, to which 1.76 ml of 1M $CeCl_3$ are added. The mixture is refluxed for another 24 hours, the solid filtered off, washed with $H_2O$ (3×20 ml) and dried at 60° C. in air. The material obtained is then calcined under oxygen (600° C. for 2 hours; heating-up rate 1° C./min) and finally reduced under $N_2/H_2$ (95:5) for 1 hour (heating-up rate 1° C./min). The approximate composition of the reaction product was $Na_{8.9}La_{15}Ce_{11}(AlO2)_{86.9}(SiO2)_{105.1} \cdot 264\ H_2O$.

Table I shows the optical properties of a zeolite luminescent material containing $Ce^{3+}$ ions (the known zeolite), of a zeolite material according to the invention containing $La^{3+}$ ions and of some known luminescent materials having an emission maximum between 300 nm and 400 nm. Both the known zeolite as well as the zeolite according to the invention had been subjected to a heat treatment wherein they were heated to several hundred degrees centigrade. UV radiation with a wavelength of 254 nm was used as excitation energy. More than 90% of this radiation was absorbed. In the table $\lambda_{max}$ is the wavelength for which the emission of the luminescent material shows a maximum and $\eta$ is the quantum efficiency. It can be seen that the quantum efficiency of the zeolite material containing $Ce^{3+}$ ions (the known zeolite) is comparable to that of the non-zeolite luminescent materials. However, the same is true for the zeolite according to the invention despite the fact that its $Ce^{3+}$ ion content is relatively low. It can also be seen that the $\lambda_{max}$ of the zeolite according to the invention differs slightly from that of the other zeolite.

TABLE I

| Luminescent material | $\lambda_{max}$(nm) | $\eta(\%)$ |
|---|---|---|
| $Na_{38.9}Ce_{16}(AlO2)_{86.9}(SiO2)_{105.1}\cdot 264\ H_2O$ | 365 | 88 |
| $Na_{8.9}La_{15}Ce_{11}(AlO2)_{86.9}(SiO2)_{105.1}\cdot 264\ H_2O$ | 358 | 81 |
| $SrB_4O_7$:Eu | 368 | 86 |
| $(Sr,Ba)_2MgSi_2O_7$:Pb | 365 | 70 |
| $BaSi_2O_5$:Pb | 350 | 76 |

In a typical example of a zeolite wherein part of the cations $S^{n+}$ are rare earth ions emitting in the visible region of the spectrum $Na_{28.7}La_{11.9}Ce_{3.8}Tb_{3.7}(Al_{86.9}Si_{105.1}O_{384})\cdot 264\ H_2O$ was prepared by incorporating the $La^{3+}$ ions first, then heating the zeolite and thereafter incorporating the $Ce^{3+}$ ions and the $Tb^{3+}$ ions. After that the zeolite was dried at 60 C. and heated at 600 C. When zeolite that had been dried but had not yet been subjected to the heat treatment was excited with 254 nm radiation, the absorptivity was found to be 77.7%. The quantum efficiency was found to be 83.2%. Only a neglectable amount of visible radiation was emitted; practically all the radiation emitted by the zeolite was in the UV-A. After the zeolite had been subjected to the heat treatment its absorptivity was found to be 67.3%. The quantum efficiency of the terbium emission is 20.5% and the quantum efficiency of the cerium was 38.4%.

According to other aspects of the invention there are provided a novel luminescent screen provided with a luminescent zeolite of the invention and a low pressure mercury discharge lamp provided with such a luminescent screen.

We claim:

1. Luminescent zeolite of the Faujasite type containing $Ce^{3+}$ ions wherein the Si/Al atomic ratio of the zeolite is in the range 1.0–4.0, characterized in that the zeolite further contains cations $S^{n+}$ wherein $n \geq 2$, and in that the sum of the amount of $Ce^{3+}$ ions and the amount of cations $S^{n+}$ per unit cell of the zeolite is at least 16.

2. Luminescent zeolite according to claim 1, wherein the amount of cations $S^{n+}$ per unit cell of the zeolite is at least 1.

3. Luminescent zeolite according to claim 2, wherein the amount of $Ce^{3+}$ ions per unit cell is at least 1.

4. Luminescent zeolite according to claim 3, wherein the cations $S^{n+}$ comprise $La^{3+}$ ions.

5. Luminescent zeolite according to claim 4, wherein part of the cations $S^{n+}$ are rare earth ions emitting in the visible region of the spectrum when activated.

6. Luminescent zeolite according to claim 5, wherein the rare earth ions emitting in the visible region of the spectrum are selected from the group consisting of $Tb^{3+}$ and $Eu^{3+}$ ions.

7. Luminescent screen comprising a luminescent material, wherein the luminescent material comprises a luminescent zeolite of the Faujasite type containing $Ce^{3+}$ ions wherein the Si/Al atomic ratio of the zeolite is in the range 1.0–4.0, characterized in that the zeolite further contains cations $S^{n+}$ where $n \geq 2$, and in that the sum of the amount of $Ce^{3+}$ ions and the amount of cations $S^{n+}$ per unit cell of the zeolite is at least 16.

8. Low pressure mercury discharge lamp provided with a luminescent screen according to claim 7.

9. Method for preparing a luminescent zeolite according to claim 1, comprising the following successive steps introducing cations $S^{n+}$ into a zeolite of the Faujasite type wherein the Si/Al ratio is in the range of 1.0–4.0 by means of ion exchange, heating the zeolite, introducing $Ce^{3+}$ ions into the zeolite by means of ion exchange, and heating the zeolite.

10. Luminescent zeolite according to claim 1, wherein the amount of $Ce^{3+}$ ions per unit cell is at least 1.

11. Luminescent zeolite according to claim 1 wherein part of the cations $S^{n+}$ are rare earth ions emitting in the visible region of the spectrum when activated.

* * * * *